(12) United States Patent
Treigherman (10) Patent No.: US 7,945,746 B2
(45) Date of Patent: May 17, 2011

(54) MEMORY SHARING OF TIME AND FREQUENCY DE-INTERLEAVER FOR ISDB-T RECEIVERS

(75) Inventor: Philip Treigherman, Newport Beach, CA (US)

(73) Assignee: Newport Media, Inc., Lake Forest, CA (US)

( * ) Notice: Subject to any disclaimer, the term of this patent is extended or adjusted under 35 U.S.C. 154(b) by 526 days.

(21) Appl. No.: 12/131,391

(22) Filed: Jun. 2, 2008

(65) Prior Publication Data

US 2009/0300300 A1    Dec. 3, 2009

(51) Int. Cl.
*G06F 13/00* (2006.01)
(52) U.S. Cl. ........................................... 711/157
(58) Field of Classification Search .............. None
See application file for complete search history.

(56) References Cited

U.S. PATENT DOCUMENTS

| 6,598,198 B1* | 7/2003 | Furuta et al. | 714/763 |
| 2003/0053358 A1* | 3/2003 | Kundu et al. | 365/201 |

OTHER PUBLICATIONS

Terrestial INtegrated Services Digital Broadcasting (ISBD-T) Specification of Channel Coding, Framing Structure and Modulation, Sep. 28, 1998.*

\* cited by examiner

*Primary Examiner* — Duc T Doan
(74) *Attorney, Agent, or Firm* — Rahman LLC (57) ABSTRACT

Time and frequency de-interleaving of interleaved data in an Integrated Services Digital Broadcasting Terrestrial (ISDB-T) receiver includes exactly one random access memory (RAM) buffer in the ISDB-T receiver that performs both time and frequency de-interleaving of the interleaved data and a buffer address calculation module for generating buffer address in the buffer. The system performs memory sharing of the time and frequency de-interleaver for ISDB-T receivers and reduces the memory size required for performing de-interleaving in an ISDB-T receiver and combines the frequency and time de-interleaver buffers into one RAM thereby reducing the memory size.

20 Claims, 5 Drawing Sheets

De-interleaving interleaved data in both a time and frequency domain using exactly on RAM buffer.    ∿ 710

↓

Generating a buffer address in the RAM buffer using a buffer address calculation module.    ∿ 720

| Before | 0  | 1  | 2  | 3  | 4  | 5  | 6  | 7  | 8 | 9  | 10 | 11 | 12 | 13 | 14 | 15 | 16 | 17 | 18 | 19 | 20 | 21 | 22 | 23 |
|--------|----|----|----|----|----|----|----|----|---|----|----|----|----|----|----|----|----|----|----|----|----|----|----|----|
| After  | 80 | 93 | 63 | 92 | 94 | 55 | 17 | 81 | 6 | 51 | 9  | 85 | 89 | 65 | 52 | 15 | 73 | 66 | 46 | 71 | 12 | 70 | 18 | 13 |

| Before | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 |
|--------|----|----|----|----|----|----|----|----|----|----|----|----|----|----|----|----|----|----|----|----|----|----|----|----|
| After  | 95 | 34 | 1  | 38 | 78 | 59 | 91 | 64 | 0  | 28 | 11 | 4  | 45 | 35 | 16 | 7  | 48 | 22 | 23 | 77 | 56 | 19 | 8  | 36 |

| Before | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 |
|--------|----|----|----|----|----|----|----|----|----|----|----|----|----|----|----|----|----|----|----|----|----|----|----|----|
| After  | 39 | 61 | 21 | 3  | 26 | 69 | 67 | 20 | 74 | 86 | 72 | 25 | 31 | 5  | 49 | 42 | 54 | 87 | 43 | 60 | 29 | 2  | 76 | 84 |

| Before | 72 | 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 |
|--------|----|----|----|----|----|----|----|----|----|----|----|----|----|----|----|----|----|----|----|----|----|----|----|----|
| After  | 83 | 40 | 14 | 79 | 27 | 57 | 44 | 37 | 30 | 68 | 47 | 88 | 75 | 41 | 90 | 10 | 33 | 32 | 62 | 50 | 58 | 82 | 53 | 24 |

MEMORY SHARING OF TIME AND FREQUENCY DE-INTERLEAVER FOR ISDB-T RECEIVERS

BACKGROUND

1. Technical Field

The embodiments herein generally relate to communication systems, and more particularly to the field of interleaving data in orthogonal frequency division multiplexing (OFDM) communication systems.

2. Description of the Related Art

An Integrated Services Digital Broadcasting-Terrestrial (ISDB-T) transmitter employs frequency interleaving to randomize burst error, occurring in the frequency domain, which is mainly caused by multipath distortion or carrier interference. An ISDB-T transmitter employs time interleaving to randomize burst error occurring in the time domain, which is mainly caused by impulse noise or fading interference. Time and frequency interleaving operates on the sequence of I/Q-mapped data carrier values (for the given modulation system) that constitute one OFDM symbol. The interleaved OFDM symbols are used to form an OFDM frame.

For performing frequency and time interleaving, existing ISDB-T receiver architectures use either two separate random access memories (RAMs) for the de-interleavers or a bank of flip-flops for the frequency de-interleaver and a RAM for the time de-interleaver. The total memory size required for frequency de-interleaving is $(2 \times n_c \times n_s)$ words, where $n_c$ is the number of data carriers per one data segment and $n_s$ is the number of data segments per one OFDM symbol. The data carriers per data segment may be 96, 192 or 384 depending on the system mode; mode 1, mode 2 or mode 3 respectively.

Time de-interleaving requires a large memory owing to de-interleaver delay buffer and therefore, time de-interleaver designs are RAM based. In RAM based designs, implementation of large number of memory pointers may lead to large number of counters. Such counters are generally implemented as flip-flops leading to a larger de-interleaver area and thereby greater power consumption.

SUMMARY

In view of the foregoing, an embodiment herein provides a system for performing time and frequency de-interleaving of interleaved data in ISDB-T receiver, where wherein the system reduces a memory built-in self test (BIST) area in the receiver, the system comprising of exactly one RAM buffer, which may be either static random access memory (SRAM) or dynamic random access memory (DRAM), and is adapted to write incoming data carriers out of order and read out the data carriers in order, in the ISDB-T receiver and is adapted to perform both time and frequency de-interleaving of the interleaved data; and a buffer address calculation module for generating buffer address in the buffer, where the module increases the size of each time de-interleaver buffer by two.

Another embodiment provides a method of performing time and frequency de-interleaving of interleaved data in an ISDB-T receiver, the method comprising of de-interleaving the interleaved data in both time and frequency domain using exactly one RAM buffer, comprising of either a SRAM or a DRAM; and generating a buffer address in the RAM buffer using a buffer address calculation module, where the module increases size of each time de-interleaver buffer by two. Data is written into the buffer out of order and read from the buffer in order.

Another embodiment provides an ISDB-T receiver, wherein a memory BIST area in the receiver is reduced, the receiver comprising of exactly one RAM buffer, which can be either SRAM or DRAM, and is adapted to write incoming data carriers out of order and read out the data carriers in order, in the ISDB-T receiver and is adapted to perform both time and frequency de-interleaving of the interleaved data; and a buffer address calculation module for generating buffer address in the buffer, where the module increases the size of each time de-interleaver buffer by two.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve a reduction in the memory required for performing de-interleaving in an ISDB-T receiver by combining the frequency and time de-interleaver buffers into one RAM. Referring now to the drawings, and more particularly to FIGS. 1A through 7, where similar reference characters denote corresponding features consistently throughout the figures, there are shown preferred embodiments.

The frequency de-interleaver has two memory locations for each carrier value within an OFDM symbol. While the current half of the memory is being written, the previous half of the memory is being read. This is equivalent to having a delay buffer of depth 2 for each carrier in an OFDM symbol; i.e., a total of $n_c \times n_s$ 2-word delay buffers. At the same time the time de-interleaver also has $n_c \times n_s$ delay buffers, where $n_c \times n_s$ is divisible by 96, and the basic 96-buffer structure shown in Table 1, which is repeated several times to form $n_c \times n_s$ buffers.

TABLE 1

Buffer size and address lookup table

| BUFFER INDEX | BUFFER SIZE for interleaving length I = | | | | | BUFFER ADDRESS for interleaving length I = | | | | |
|---|---|---|---|---|---|---|---|---|---|---|
| I | 1 | 2 | 4 | 8 | 16 | 1 | 2 | 4 | 8 | 16 |
| 0 | 95 | 190 | 380 | 760 | 1520 | 0 | 0 | 0 | 0 | 0 |
| 1 | 90 | 180 | 360 | 720 | 1440 | 95 | 190 | 380 | 760 | 1520 |
| 2 | 85 | 170 | 340 | 680 | 1360 | 185 | 370 | 740 | 1480 | 2960 |
| 3 | 80 | 160 | 320 | 640 | 1280 | 270 | 540 | 1080 | 2160 | 4320 |
| 4 | 75 | 150 | 300 | 600 | 1200 | 350 | 700 | 1400 | 2800 | 5600 |
| 5 | 70 | 140 | 280 | 560 | 1120 | 425 | 850 | 1700 | 3400 | 6800 |
| 6 | 65 | 130 | 260 | 520 | 1040 | 495 | 990 | 1980 | 3960 | 7920 |
| 7 | 60 | 120 | 240 | 480 | 960 | 560 | 1120 | 2240 | 4480 | 8960 |
| 8 | 55 | 110 | 220 | 440 | 880 | 620 | 1240 | 2480 | 4960 | 9920 |
| 9 | 50 | 100 | 200 | 400 | 800 | 675 | 1350 | 2700 | 5400 | 10800 |
| 10 | 45 | 90 | 180 | 360 | 720 | 725 | 1450 | 2900 | 5800 | 11600 |
| 11 | 40 | 80 | 160 | 320 | 640 | 770 | 1540 | 3080 | 6160 | 12320 |
| 12 | 35 | 70 | 140 | 280 | 560 | 810 | 1620 | 3240 | 6480 | 12960 |
| 13 | 30 | 60 | 120 | 240 | 480 | 845 | 1690 | 3380 | 6760 | 13520 |
| 14 | 25 | 50 | 100 | 200 | 400 | 875 | 1750 | 3500 | 7000 | 14000 |
| 15 | 20 | 40 | 80 | 160 | 320 | 900 | 1800 | 3600 | 7200 | 14400 |
| 16 | 15 | 30 | 60 | 120 | 240 | 920 | 1840 | 3680 | 7360 | 14720 |
| 17 | 10 | 20 | 40 | 80 | 160 | 935 | 1870 | 3740 | 7480 | 14960 |
| 18 | 5 | 10 | 20 | 40 | 80 | 945 | 1890 | 3780 | 7560 | 15120 |
| 19 | 0 | 0 | 0 | 0 | 0 | 950 | 1900 | 3800 | 7600 | 15200 |
| 20 | 91 | 182 | 364 | 728 | 1456 | 950 | 1900 | 3800 | 7600 | 15200 |
| 21 | 86 | 172 | 344 | 688 | 1376 | 1041 | 2082 | 4164 | 8328 | 16656 |
| 22 | 81 | 162 | 324 | 648 | 1296 | 1127 | 2254 | 4508 | 9016 | 18032 |
| 23 | 76 | 152 | 304 | 608 | 1216 | 1208 | 2416 | 4832 | 9664 | 19328 |
| 24 | 71 | 142 | 284 | 568 | 1136 | 1284 | 2568 | 5136 | 10272 | 20544 |
| 25 | 66 | 132 | 264 | 528 | 1056 | 1355 | 2710 | 5420 | 10840 | 21680 |
| 26 | 61 | 122 | 244 | 488 | 976 | 1421 | 2842 | 5684 | 11368 | 22736 |
| 27 | 56 | 112 | 224 | 448 | 896 | 1482 | 2964 | 5928 | 11856 | 23712 |
| 28 | 51 | 102 | 204 | 408 | 816 | 1538 | 3076 | 6152 | 12304 | 24608 |
| 29 | 46 | 92 | 184 | 368 | 736 | 1589 | 3178 | 6356 | 12712 | 25424 |
| 30 | 41 | 82 | 164 | 328 | 656 | 1635 | 3270 | 6540 | 13080 | 26160 |
| 31 | 36 | 72 | 144 | 288 | 576 | 1676 | 3352 | 6704 | 13408 | 26816 |
| 32 | 31 | 62 | 124 | 248 | 496 | 1712 | 3424 | 6848 | 13696 | 27392 |
| 33 | 26 | 52 | 104 | 208 | 416 | 1743 | 3486 | 6972 | 13944 | 27888 |
| 34 | 21 | 42 | 84 | 168 | 336 | 1769 | 3538 | 7076 | 14152 | 28304 |
| 35 | 16 | 32 | 64 | 128 | 256 | 1790 | 3580 | 7160 | 14320 | 28640 |
| 36 | 11 | 22 | 44 | 88 | 176 | 1806 | 3612 | 7224 | 14448 | 28896 |
| 37 | 6 | 12 | 24 | 48 | 96 | 1817 | 3634 | 7268 | 14536 | 29072 |
| 38 | 1 | 2 | 4 | 8 | 16 | 1823 | 3646 | 7292 | 14584 | 29168 |
| 39 | 92 | 184 | 368 | 736 | 1472 | 1824 | 3648 | 7296 | 14592 | 29184 |
| 40 | 87 | 174 | 348 | 696 | 1392 | 1916 | 3832 | 7664 | 15328 | 30656 |
| 41 | 82 | 164 | 328 | 656 | 1312 | 2003 | 4006 | 8012 | 16024 | 32048 |
| 42 | 77 | 154 | 308 | 616 | 1232 | 2085 | 4170 | 8340 | 16680 | 33360 |
| 43 | 72 | 144 | 288 | 576 | 1152 | 2162 | 4324 | 8648 | 17296 | 34592 |
| 44 | 67 | 134 | 268 | 536 | 1072 | 2234 | 4468 | 8936 | 17872 | 35744 |
| 45 | 62 | 124 | 248 | 496 | 992 | 2301 | 4602 | 9204 | 18408 | 36816 |
| 46 | 57 | 114 | 228 | 456 | 912 | 2363 | 4726 | 9452 | 18904 | 37808 |
| 47 | 52 | 104 | 208 | 416 | 832 | 2420 | 4840 | 9680 | 19360 | 38720 |
| 48 | 47 | 94 | 188 | 376 | 752 | 2472 | 4944 | 9888 | 19776 | 39552 |
| 49 | 42 | 84 | 168 | 336 | 672 | 2519 | 5038 | 10076 | 20152 | 40304 |
| 50 | 37 | 74 | 148 | 296 | 592 | 2561 | 5122 | 10244 | 20488 | 40976 |
| 51 | 32 | 64 | 128 | 256 | 512 | 2598 | 5196 | 10392 | 20784 | 41568 |
| 52 | 27 | 54 | 108 | 216 | 432 | 2630 | 5260 | 10520 | 21040 | 42080 |
| 53 | 22 | 44 | 88 | 176 | 352 | 2657 | 5314 | 10628 | 21256 | 42512 |
| 54 | 17 | 34 | 68 | 136 | 272 | 2679 | 5358 | 10716 | 21432 | 42864 |
| 55 | 12 | 24 | 48 | 96 | 192 | 2696 | 5392 | 10784 | 21568 | 43136 |
| 56 | 7 | 14 | 28 | 56 | 112 | 2708 | 5416 | 10832 | 21664 | 43328 |
| 57 | 2 | 4 | 8 | 16 | 32 | 2715 | 5430 | 10860 | 21720 | 43440 |
| 58 | 93 | 186 | 372 | 744 | 1488 | 2717 | 5434 | 10868 | 21736 | 43472 |
| 59 | 88 | 176 | 352 | 704 | 1408 | 2810 | 5620 | 11240 | 22480 | 44960 |
| 60 | 83 | 166 | 332 | 664 | 1328 | 2898 | 5796 | 11592 | 23184 | 46368 |
| 61 | 78 | 156 | 312 | 624 | 1248 | 2981 | 5962 | 11924 | 23848 | 47696 |
| 62 | 73 | 146 | 292 | 584 | 1168 | 3059 | 6118 | 12236 | 24472 | 48944 |
| 63 | 68 | 136 | 272 | 544 | 1088 | 3132 | 6264 | 12528 | 25056 | 50112 |
| 64 | 63 | 126 | 252 | 504 | 1008 | 3200 | 6400 | 12800 | 25600 | 51200 |

TABLE 1-continued

Buffer size and address lookup table

| BUFFER INDEX | BUFFER SIZE for interleaving length I = | | | | | BUFFER ADDRESS for interleaving length I = | | | | |
|---|---|---|---|---|---|---|---|---|---|---|
| I | 1 | 2 | 4 | 8 | 16 | 1 | 2 | 4 | 8 | 16 |
| 65 | 58 | 116 | 232 | 464 | 928 | 3263 | 6526 | 13052 | 26104 | 52208 |
| 66 | 53 | 106 | 212 | 424 | 848 | 3321 | 6642 | 13284 | 26568 | 53136 |
| 67 | 48 | 96 | 192 | 384 | 768 | 3374 | 6748 | 13496 | 26992 | 53984 |
| 68 | 43 | 86 | 172 | 344 | 688 | 3422 | 6844 | 13688 | 27376 | 54752 |
| 69 | 38 | 76 | 152 | 304 | 608 | 3465 | 6930 | 13860 | 27720 | 55440 |
| 70 | 33 | 66 | 132 | 264 | 528 | 3503 | 7006 | 14012 | 28024 | 56048 |
| 71 | 28 | 56 | 112 | 224 | 448 | 3536 | 7072 | 14144 | 28288 | 56576 |
| 72 | 23 | 46 | 92 | 184 | 368 | 3564 | 7128 | 14256 | 28512 | 57024 |
| 73 | 18 | 36 | 72 | 144 | 288 | 3587 | 7174 | 14348 | 28696 | 57392 |
| 74 | 13 | 26 | 52 | 104 | 208 | 3605 | 7210 | 14420 | 28840 | 57680 |
| 75 | 8 | 16 | 32 | 64 | 128 | 3618 | 7236 | 14472 | 28944 | 57888 |
| 76 | 3 | 6 | 12 | 24 | 48 | 3626 | 7252 | 14504 | 29008 | 58016 |
| 77 | 94 | 188 | 376 | 752 | 1504 | 3629 | 7258 | 14516 | 29032 | 58064 |
| 78 | 89 | 178 | 356 | 712 | 1424 | 3723 | 7446 | 14892 | 29784 | 59568 |
| 79 | 84 | 168 | 336 | 672 | 1344 | 3812 | 7624 | 15248 | 30496 | 60992 |
| 80 | 79 | 158 | 316 | 632 | 1264 | 3896 | 7792 | 15584 | 31168 | 62336 |
| 81 | 74 | 148 | 296 | 592 | 1184 | 3975 | 7950 | 15900 | 31800 | 63600 |
| 82 | 69 | 138 | 276 | 552 | 1104 | 4049 | 8098 | 16196 | 32392 | 64784 |
| 83 | 64 | 128 | 256 | 512 | 1024 | 4118 | 8236 | 16472 | 32944 | 65888 |
| 84 | 59 | 118 | 236 | 472 | 944 | 4182 | 8364 | 16728 | 33456 | 66912 |
| 85 | 54 | 108 | 216 | 432 | 864 | 4241 | 8482 | 16964 | 33928 | 67856 |
| 86 | 49 | 98 | 196 | 392 | 784 | 4295 | 8590 | 17180 | 34360 | 68720 |
| 87 | 44 | 88 | 176 | 352 | 704 | 4344 | 8688 | 17376 | 34752 | 69504 |
| 88 | 39 | 78 | 156 | 312 | 624 | 4388 | 8776 | 17552 | 35104 | 70208 |
| 89 | 34 | 68 | 136 | 272 | 544 | 4427 | 8854 | 17708 | 35416 | 70832 |
| 90 | 29 | 58 | 116 | 232 | 464 | 4461 | 8922 | 17844 | 35688 | 71376 |
| 91 | 24 | 48 | 96 | 192 | 384 | 4490 | 8980 | 17960 | 35920 | 71840 |
| 92 | 19 | 38 | 76 | 152 | 304 | 4514 | 9028 | 18056 | 36112 | 72224 |
| 93 | 14 | 28 | 56 | 112 | 224 | 4533 | 9066 | 18132 | 36264 | 72528 |
| 94 | 9 | 18 | 36 | 72 | 144 | 4547 | 9094 | 18188 | 36376 | 72752 |
| 95 | 4 | 8 | 16 | 32 | 64 | 4556 | 9112 | 18224 | 36448 | 72896 |

The frequency de-interleaver delay buffers are written out-of-order and read in order, the frequency de-interleaver output feeds the time de-interleaver, and therefore the time de-interleaver buffers are written and read in order. Therefore, the corresponding frequency and time de-interleaver buffers can be combined into one RAM. Due to the combination of the buffers, each of the time de-interleaver buffers grows by two locations. The combined architecture operates similar to the original time de-interleaver design, except that the incoming carriers are written to the delay buffers out-of-order and the buffer address calculation logic adds 2 to the size of each buffer. The combined buffer size and address lookup table are provided in Table 2, which shows the resulting combined frequency and time de-interleaver buffer structure.

TABLE 2

Combined buffer size and address lookup table

| Buffer | Combined size I | | | | | Combined address I | | | | |
|---|---|---|---|---|---|---|---|---|---|---|
| | 0 | 1 | 2 | 4 | 8 | 0 | 1 | 2 | 4 | 8 |
| 0 | 2 | 97 | 192 | 382 | 762 | 0 | 0 | 0 | 0 | 0 |
| 1 | 2 | 92 | 182 | 362 | 722 | 2 | 97 | 192 | 382 | 762 |
| 2 | 2 | 87 | 172 | 342 | 682 | 4 | 189 | 374 | 744 | 1484 |
| 3 | 2 | 82 | 162 | 322 | 642 | 6 | 276 | 546 | 1086 | 2166 |
| 4 | 2 | 77 | 152 | 302 | 602 | 8 | 358 | 708 | 1408 | 2808 |
| 5 | 2 | 72 | 142 | 282 | 562 | 10 | 435 | 860 | 1710 | 3410 |
| 6 | 2 | 67 | 132 | 262 | 522 | 12 | 507 | 1002 | 1992 | 3972 |
| 7 | 2 | 62 | 122 | 242 | 482 | 14 | 574 | 1134 | 2254 | 4494 |
| 8 | 2 | 57 | 112 | 222 | 442 | 16 | 636 | 1256 | 2496 | 4976 |
| 9 | 2 | 52 | 102 | 202 | 402 | 18 | 693 | 1368 | 2718 | 5418 |
| 10 | 2 | 47 | 92 | 182 | 362 | 20 | 745 | 1470 | 2920 | 5820 |
| 11 | 2 | 42 | 82 | 162 | 322 | 22 | 792 | 1562 | 3102 | 6182 |
| 12 | 2 | 37 | 72 | 142 | 282 | 24 | 834 | 1644 | 3264 | 6504 |
| 13 | 2 | 32 | 62 | 122 | 242 | 26 | 871 | 1716 | 3406 | 6786 |
| 14 | 2 | 27 | 52 | 102 | 202 | 28 | 903 | 1778 | 3528 | 7028 |
| 15 | 2 | 22 | 42 | 82 | 162 | 30 | 930 | 1830 | 3630 | 7230 |
| 16 | 2 | 17 | 32 | 62 | 122 | 32 | 952 | 1872 | 3712 | 7392 |
| 17 | 2 | 12 | 22 | 42 | 82 | 34 | 969 | 1904 | 3774 | 7514 |
| 18 | 2 | 7 | 12 | 22 | 42 | 36 | 981 | 1926 | 3816 | 7596 |
| 19 | 2 | 2 | 2 | 2 | 2 | 38 | 988 | 1938 | 3838 | 7638 |

TABLE 2-continued

Combined buffer size and address lookup table

| | Combined size I | | | | | Combined address I | | | | |
|---|---|---|---|---|---|---|---|---|---|---|
| Buffer | 0 | 1 | 2 | 4 | 8 | 0 | 1 | 2 | 4 | 8 |
| 20 | 2 | 93 | 184 | 366 | 730 | 40 | 990 | 1940 | 3840 | 7640 |
| 21 | 2 | 88 | 174 | 346 | 690 | 42 | 1083 | 2124 | 4206 | 8370 |
| 22 | 2 | 83 | 164 | 326 | 650 | 44 | 1171 | 2298 | 4552 | 9060 |
| 23 | 2 | 78 | 154 | 306 | 610 | 46 | 1254 | 2462 | 4878 | 9710 |
| 24 | 2 | 73 | 144 | 286 | 570 | 48 | 1332 | 2616 | 5184 | 10320 |
| 25 | 2 | 68 | 134 | 266 | 530 | 50 | 1405 | 2760 | 5470 | 10890 |
| 26 | 2 | 63 | 124 | 246 | 490 | 52 | 1473 | 2894 | 5736 | 11420 |
| 27 | 2 | 58 | 114 | 226 | 450 | 54 | 1536 | 3018 | 5982 | 11910 |
| 28 | 2 | 53 | 104 | 206 | 410 | 56 | 1594 | 3132 | 6208 | 12360 |
| 29 | 2 | 48 | 94 | 186 | 370 | 58 | 1647 | 3236 | 6414 | 12770 |
| 30 | 2 | 43 | 84 | 166 | 330 | 60 | 1695 | 3330 | 6600 | 13140 |
| 31 | 2 | 38 | 74 | 146 | 290 | 62 | 1738 | 3414 | 6766 | 13470 |
| 32 | 2 | 33 | 64 | 126 | 250 | 64 | 1776 | 3488 | 6912 | 13760 |
| 33 | 2 | 28 | 54 | 106 | 210 | 66 | 1809 | 3552 | 7038 | 14010 |
| 34 | 2 | 23 | 44 | 86 | 170 | 68 | 1837 | 3606 | 7144 | 14220 |
| 35 | 2 | 18 | 34 | 66 | 130 | 70 | 1860 | 3650 | 7230 | 14390 |
| 36 | 2 | 13 | 24 | 46 | 90 | 72 | 1878 | 3684 | 7296 | 14520 |
| 37 | 2 | 8 | 14 | 26 | 50 | 74 | 1891 | 3708 | 7342 | 14610 |
| 38 | 2 | 3 | 4 | 6 | 10 | 76 | 1899 | 3722 | 7368 | 14660 |
| 39 | 2 | 94 | 186 | 370 | 738 | 78 | 1902 | 3726 | 7374 | 14670 |
| 40 | 2 | 89 | 176 | 350 | 698 | 80 | 1996 | 3912 | 7744 | 15408 |
| 41 | 2 | 84 | 166 | 330 | 658 | 82 | 2085 | 4088 | 8094 | 16106 |
| 42 | 2 | 79 | 156 | 310 | 618 | 84 | 2169 | 4254 | 8424 | 16764 |
| 43 | 2 | 74 | 146 | 290 | 578 | 86 | 2248 | 4410 | 8734 | 17382 |
| 44 | 2 | 69 | 136 | 270 | 538 | 88 | 2322 | 4556 | 9024 | 17960 |
| 45 | 2 | 64 | 126 | 250 | 498 | 90 | 2391 | 4692 | 9294 | 18498 |
| 46 | 2 | 59 | 116 | 230 | 458 | 92 | 2455 | 4818 | 9544 | 18996 |
| 47 | 2 | 54 | 106 | 210 | 418 | 94 | 2514 | 4934 | 9774 | 19454 |
| 48 | 2 | 49 | 96 | 190 | 378 | 96 | 2568 | 5040 | 9984 | 19872 |
| 49 | 2 | 44 | 86 | 170 | 338 | 98 | 2617 | 5136 | 10174 | 20250 |
| 50 | 2 | 39 | 76 | 150 | 298 | 100 | 2661 | 5222 | 10344 | 20588 |
| 51 | 2 | 34 | 66 | 130 | 258 | 102 | 2700 | 5298 | 10494 | 20886 |
| 52 | 2 | 29 | 56 | 110 | 218 | 104 | 2734 | 5364 | 10624 | 21144 |
| 53 | 2 | 24 | 46 | 90 | 178 | 106 | 2763 | 5420 | 10734 | 21362 |
| 54 | 2 | 19 | 36 | 70 | 138 | 108 | 2787 | 5466 | 10824 | 21540 |
| 55 | 2 | 14 | 26 | 50 | 98 | 110 | 2806 | 5502 | 10894 | 21678 |
| 56 | 2 | 9 | 16 | 30 | 58 | 112 | 2820 | 5528 | 10944 | 21776 |
| 57 | 2 | 4 | 6 | 10 | 18 | 114 | 2829 | 5544 | 10974 | 21834 |
| 58 | 2 | 95 | 188 | 374 | 746 | 116 | 2833 | 5550 | 10984 | 21852 |
| 59 | 2 | 90 | 178 | 354 | 706 | 118 | 2928 | 5738 | 11358 | 22598 |
| 60 | 2 | 85 | 168 | 334 | 666 | 120 | 3018 | 5916 | 11712 | 23304 |
| 61 | 2 | 80 | 158 | 314 | 626 | 122 | 3103 | 6084 | 12046 | 23970 |
| 62 | 2 | 75 | 148 | 294 | 586 | 124 | 3183 | 6242 | 12360 | 24596 |
| 63 | 2 | 70 | 138 | 274 | 546 | 126 | 3258 | 6390 | 12654 | 25182 |
| 64 | 2 | 65 | 128 | 254 | 506 | 128 | 3328 | 6528 | 12928 | 25728 |
| 65 | 2 | 60 | 118 | 234 | 466 | 130 | 3393 | 6656 | 13182 | 26234 |
| 66 | 2 | 55 | 108 | 214 | 426 | 132 | 3453 | 6774 | 13416 | 26700 |
| 67 | 2 | 50 | 98 | 194 | 386 | 134 | 3508 | 6882 | 13630 | 27126 |
| 68 | 2 | 45 | 88 | 174 | 346 | 136 | 3558 | 6980 | 13824 | 27512 |
| 69 | 2 | 40 | 78 | 154 | 306 | 138 | 3603 | 7068 | 13998 | 27858 |
| 70 | 2 | 35 | 68 | 134 | 266 | 140 | 3643 | 7146 | 14152 | 28164 |
| 71 | 2 | 30 | 58 | 114 | 226 | 142 | 3678 | 7214 | 14286 | 28430 |
| 72 | 2 | 25 | 48 | 94 | 186 | 144 | 3708 | 7272 | 14400 | 28656 |
| 73 | 2 | 20 | 38 | 74 | 146 | 146 | 3733 | 7320 | 14494 | 28842 |
| 74 | 2 | 15 | 28 | 54 | 106 | 148 | 3753 | 7358 | 14568 | 28988 |
| 75 | 2 | 10 | 18 | 34 | 66 | 150 | 3768 | 7386 | 14622 | 29094 |
| 76 | 2 | 5 | 8 | 14 | 26 | 152 | 3778 | 7404 | 14656 | 29160 |
| 77 | 2 | 96 | 190 | 378 | 754 | 154 | 3783 | 7412 | 14670 | 29186 |
| 78 | 2 | 91 | 180 | 358 | 714 | 156 | 3879 | 7602 | 15048 | 29940 |
| 79 | 2 | 86 | 170 | 338 | 674 | 158 | 3970 | 7782 | 15406 | 30654 |
| 80 | 2 | 81 | 160 | 318 | 634 | 160 | 4056 | 7952 | 15744 | 31328 |
| 81 | 2 | 76 | 150 | 298 | 594 | 162 | 4137 | 8112 | 16062 | 31962 |
| 82 | 2 | 71 | 140 | 278 | 554 | 164 | 4213 | 8262 | 16360 | 32556 |
| 83 | 2 | 66 | 130 | 258 | 514 | 166 | 4284 | 8402 | 16638 | 33110 |
| 84 | 2 | 61 | 120 | 238 | 474 | 168 | 4350 | 8532 | 16896 | 33624 |
| 85 | 2 | 56 | 110 | 218 | 434 | 170 | 4411 | 8652 | 17134 | 34098 |
| 86 | 2 | 51 | 100 | 198 | 394 | 172 | 4467 | 8762 | 17352 | 34532 |
| 87 | 2 | 46 | 90 | 178 | 354 | 174 | 4518 | 8862 | 17550 | 34926 |
| 88 | 2 | 41 | 80 | 158 | 314 | 176 | 4564 | 8952 | 17728 | 35280 |
| 89 | 2 | 36 | 70 | 138 | 274 | 178 | 4605 | 9032 | 17886 | 35594 |
| 90 | 2 | 31 | 60 | 118 | 234 | 180 | 4641 | 9102 | 18024 | 35868 |
| 91 | 2 | 26 | 50 | 98 | 194 | 182 | 4672 | 9162 | 18142 | 36102 |
| 92 | 2 | 21 | 40 | 78 | 154 | 184 | 4698 | 9212 | 18240 | 36296 |

TABLE 2-continued

Combined buffer size and address lookup table

| Buffer | Combined size I | | | | | Combined address I | | | | |
|---|---|---|---|---|---|---|---|---|---|---|
| | 0 | 1 | 2 | 4 | 8 | 0 | 1 | 2 | 4 | 8 |
| 93 | 2 | 16 | 30 | 58 | 114 | 186 | 4719 | 9252 | 18318 | 36450 |
| 94 | 2 | 11 | 20 | 38 | 74 | 188 | 4735 | 9282 | 18376 | 36564 |
| 95 | 2 | 6 | 10 | 18 | 34 | 190 | 4746 | 9302 | 18414 | 36638 |

Figure 1A:
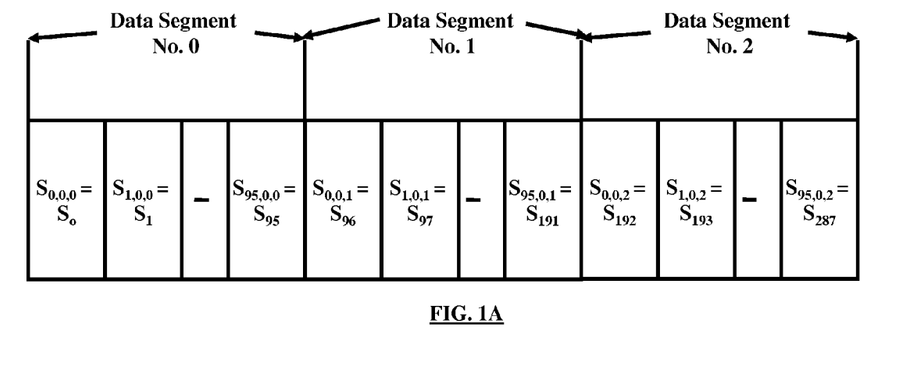
FIG. 1A illustrates the symbol alignment before interleaving for a mode 1, 3 segment case according to an embodiment herein.
Figure 1B:
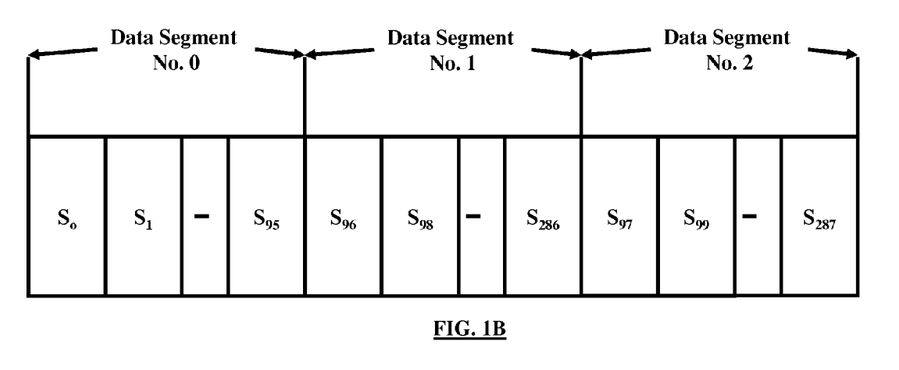
FIG. 1B illustrates the symbol alignment after interleaving for a mode 1, 3 segment case according to an embodiment herein.

FIGS. 1A and 1B illustrate inter-segment interleaving for a mode 1, 3 segment case according to an embodiment herein. FIGS. 1A and 1B illustrate the interleaving operation (FIG. 1A is the symbol alignment before interleaving and FIG. 1B is the symbol alignment after interleaving), which is performed within a transmission layer containing more than one data segment; e.g., in layer B of 3-segment transmission, which contains two segments. In FIGS. 1A and 1B "S" represents data carriers within each segment in mode 1. There are 96 data carriers per segment. After the interleaving, in FIG. 1B, all even-order carriers are moved to segment number 1 and all odd-order carriers are moved to segment number 2. The segment number 0 is not affected by the inter-segment interleaving because it belongs to the layer A, which contains only one segment.

Figure 2:
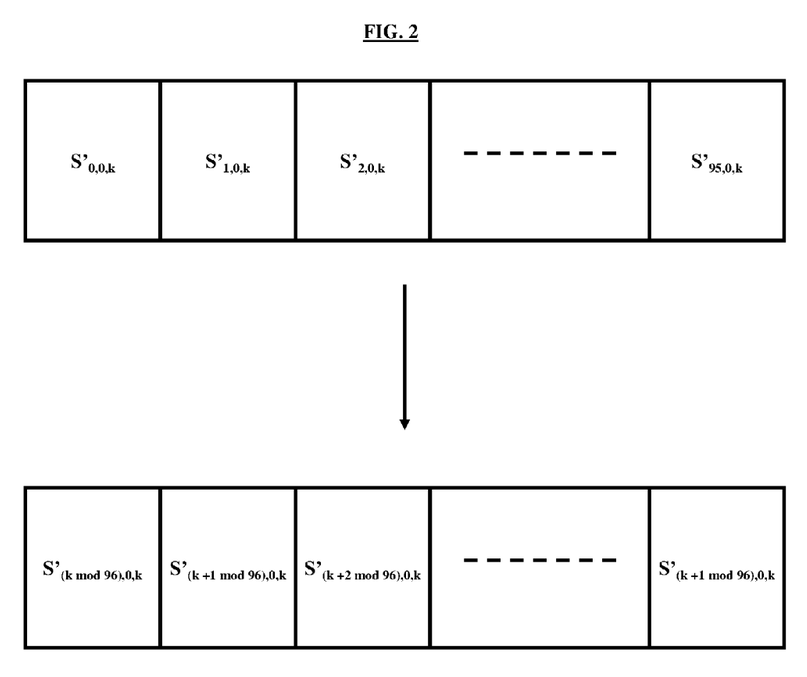
FIG. 2 illustrates intra-segment rotation for a mode 1, 3 segment case according to an embodiment herein.

FIG. 2 illustrates intra-segment rotation for a mode 1, 3 segment case according to an embodiment herein. In FIG. 2 "k" is the corresponding segment number: 0, 1, 2, etc. In this operation all data carriers within a given segment are rotated to the right within the segment by k carrier positions. The segment number 0 is not affected by the rotation operation because k=0 for this segment, which yields rotation by 0 carrier positions.

Figure 3:
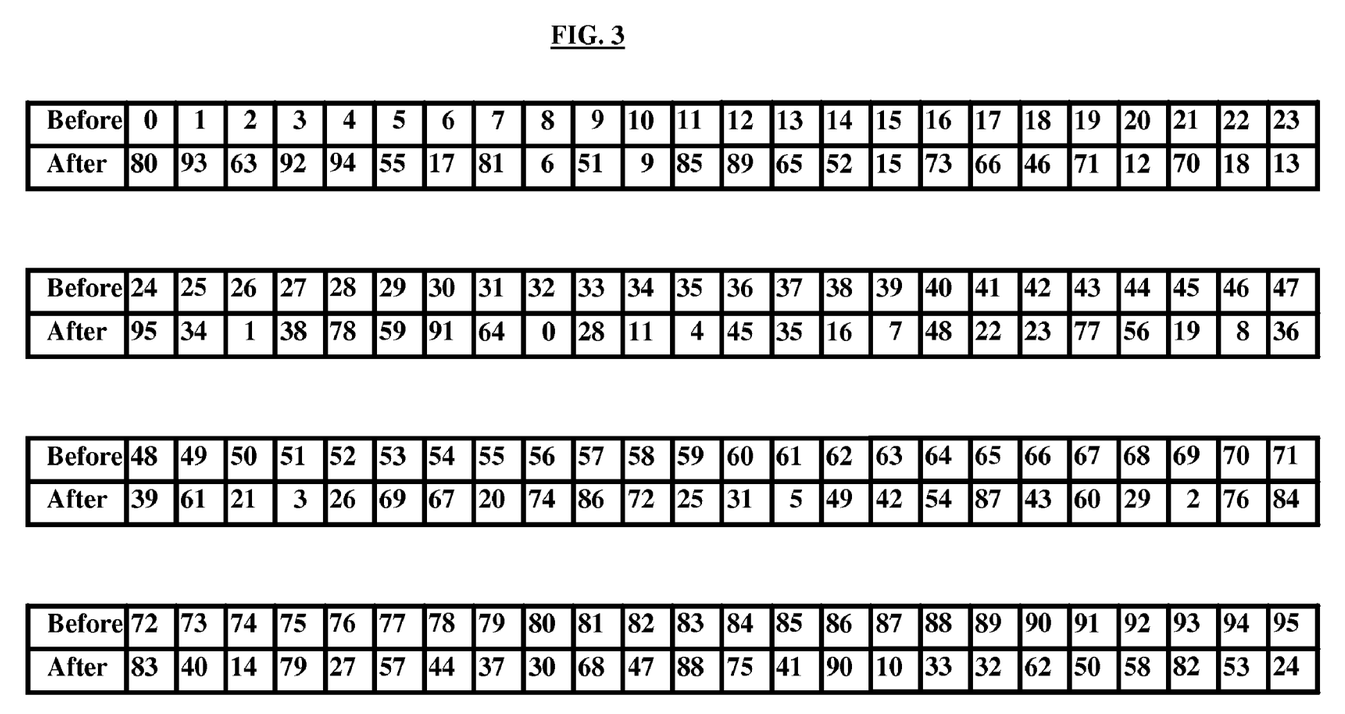
FIG. 3 illustrates intra-segment carrier randomization for a mode 1, 3 segment case according to an embodiment herein.

FIG. 3 illustrates an intra-segment randomization for a mode 1, 3 segment case according to an embodiment herein. FIG. 3 illustrates an exchange of data carrier locations based on the specified randomization table. Different system modes use different randomization tables.

Figure 4:
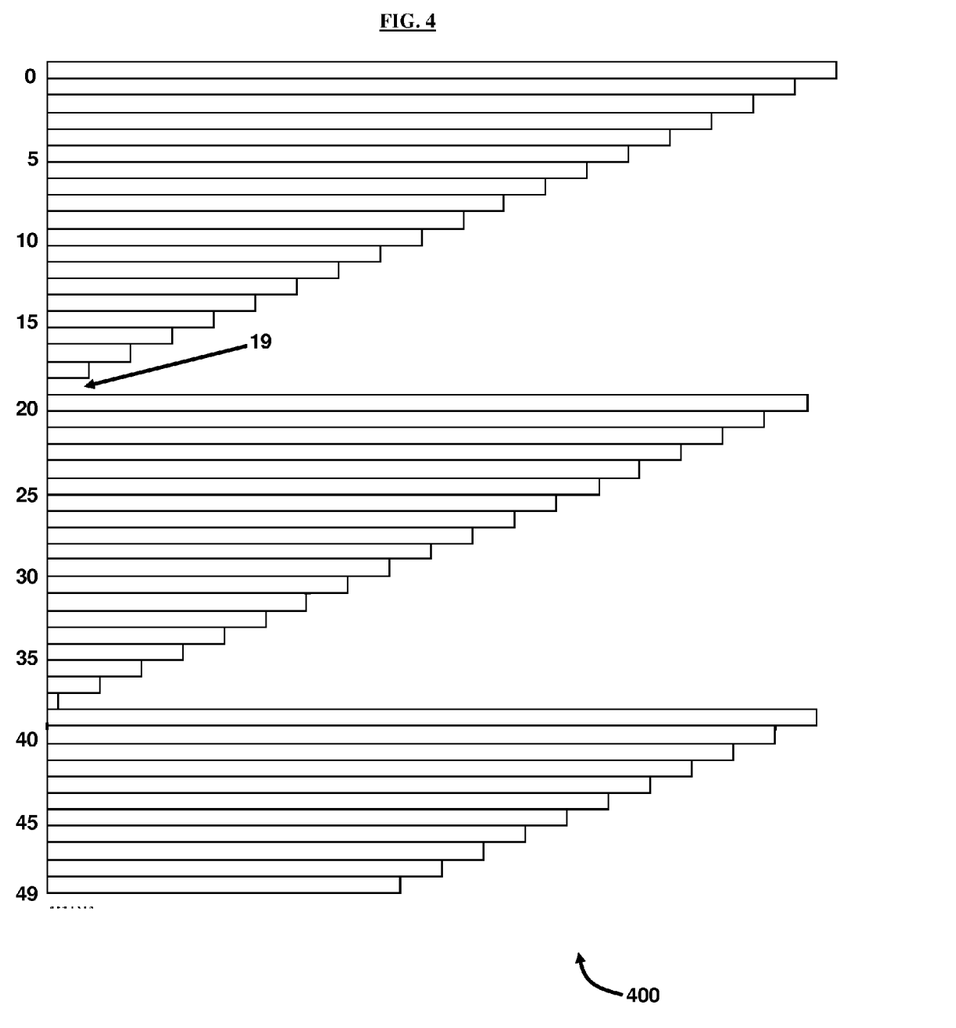
FIG. 4 illustrates a time de-interleaver buffer structure according to an embodiment herein.

FIG. 4 illustrates a time de-interleaver buffer structure 400 according to an embodiment herein. The time domain interleaving uses a convolutional interleaving scheme, in which every data carrier in an OFDM symbol is fed into a delay buffer of depth: $b_i=I\times((i\times5) \mod 96)$. Here "i" is the buffer index ranging from 0 to $n_c-1$ and "i" is the interleaving length associated with a given OFDM transmission layer, which takes one of the following values: 0, 1, 2, 4, 8, or 16. The operation of the convolutional time de-interleaver in the ISDB-T receiver is the opposite in the sense that delay buffer depths are given by: $bx_i=I\times95-I\times((i\times5) \mod 96)$. There are a total of 95 distinct non-zero delay buffers sizes in the de-interleaver, regardless of the system mode, since the buffer depth pattern given by $bx_i=I\times95-I\times((i\times5) \mod 96)$ will repeat every 96 buffers, and also $bx19=bx115=bx211=bx307=0$, so the 19th, 115th, $211^{th}$, and 307th data carriers in every OFDM symbol are transferred without delay. The general time de-interleaver buffer structure 400 is illustrated in FIG. 4, showing the first 50 buffers with the buffer depth at the beginning of the shown range bx0=95 and buffer depth at the end of this range bx49=42. Each buffer entry requires the number of bits equal to the data carrier soft decision width, therefore the total amount of memory required for the time de-interleaver is the combined depth of all the buffers multiplied by the data carrier bit width, resulting in a very large memory size since the total combined buffer depth for one segment in mode 1 is 72,960 entries for I=16. Table 3 indicates the total RAM size.

TABLE 3

Total RAM size
TOTAL RAM SIZE FOR 1 SEGMENT IN MODE 1
for interleaving length I =

| 1 | 2 | 4 | 8 | 16 |
|---|---|---|---|---|
| 4,560 | 9,120 | 18,240 | 36,480 | 72,960 |

Figure 5:
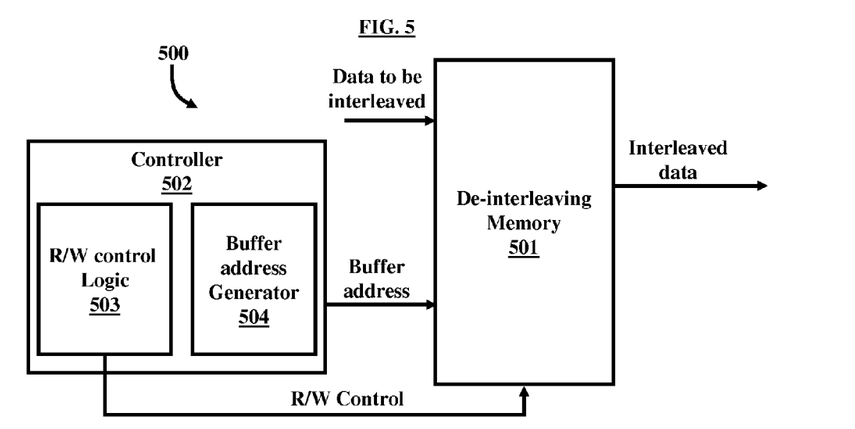
FIG. 5 is a block diagram of a de-interleaving apparatus according to an embodiment herein.

FIG. 5 a block diagram of a de-interleaving apparatus 500 according to an embodiment herein. The apparatus 500 comprises a de-interleaving memory 501, a controller 502, a read/write (R/W) control logic 503, and a buffer address generator 504. The controller 502 comprises of R/W control logic 503 and the buffer address generator 504 embedded within. The frequency and time de-interleaver memories are combined into a single memory; i.e. the de-interleaver memory 501. The inputs for the de-interleaving memory 501 are the generated buffer address and the data to be interleaved. The other input for the de-interleaving memory 501 is the data to be interleaved. The output from the de-interleaving memory 501 is the interleaved data. The de-interleaver memory 501 may be embodied as DRAM or SRAM. The controller 502 generates the buffer address by the buffer address generator 504. The controller also provides the R/W control bus to the de-interleaver memory 501. The data to be interleaved acts as an input to the de-interleaver memory 501 and is provided with buffer address by the buffer address generator 504. During the read write operations the memory is divided into two parts. For example the frequency de-interleaver has two memory locations for each carrier value within an OFDM symbol, while the current half of the memory is being written; the previous half of the memory is being read. Thus, the R/W control bus controls the memory during the read write operations taking place in the de-interleaver memory 501. The interleaved data is obtained as an output from the de-interleaver memory 501.

Figure 6:
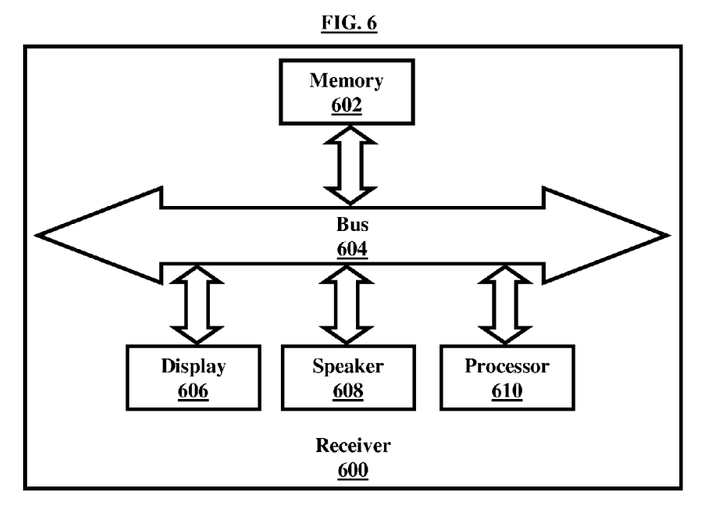
FIG. 6 is a schematic diagram of a receiver according to an embodiment herein.

FIG. 6 illustrates a schematic diagram of a receiver 600 having an a memory 602 having a computer set of instructions, a bus 604, a display 606, a speaker 608, and a processor 610 capable of processing a set of instructions to perform any one or more of the methodologies herein, according to an embodiment herein. The processor 610 may also enable digital content to be consumed in the form of video for output via one or more displays 606 or audio for output via speaker and/or earphones 608. The processor 610 may also carry out the methods described herein and in accordance with the embodiments herein.

Digital content may also be stored in the memory 602 for future processing or consumption. The memory 602 may also store program specific information and/or service information (PSI/SI), including information about digital content (e.g., the detected information bits) available in the future or stored from the past. A user of the receiver 600 may view this stored information on display 606 and select an item of for viewing, listening, or other uses via input, which may take the form of keypad, scroll, or other input device(s) or combinations thereof. When digital content is selected, the processor 610 may pass information. The content and PSI/SI may be passed among functions within the receiver 600 using bus 604.

Figure 7:
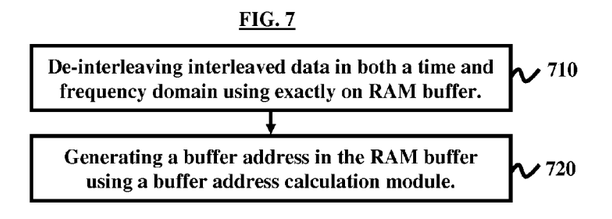
FIG. 7 is a flow diagram illustrating a method according to an embodiment herein.

FIG. 7, with reference to FIGS. 1A through 6, illustrates a method of performing time and frequency de-interleaving of interleaved data in an ISDB-T receiver 600, wherein the method comprises de-interleaving (710) the interleaved data in a both time and frequency domain using exactly one RAM buffer 501 comprising of either a SRAM or a DRAM; and generating (720) a buffer address in the RAM buffer 501 using a buffer address calculation module (i.e., controller 502), where the module increases size of each time de-interleaver buffer by two. Data is written into the buffer 501 out of order and read from the buffer 501 in order. The embodiments herein eliminate overhead area related to the frequency de-interleaver stand-alone RAM implementation. The overhead area also includes area that is used by the memory BIST schematic.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for performing time and frequency de-interleaving of interleaved data in an Integrated Services Digital Broadcasting Terrestrial (ISDB-T) receiver, said system comprising:
    exactly one random access memory (RAM) buffer in said ISDB-T receiver that performs both time and frequency de-interleaving of said interleaved data; and
    a buffer address calculation module that generates a buffer address in said buffer and increases a size of a time de-interleaver buffer by two locations.

2. The system of claim 1, wherein said RAM buffer comprises a dynamic random access memory (DRAM).

3. The system of claim 1, wherein said RAM buffer comprises a static random access memory (SRAM).

4. The system of claim 1, wherein said RAM buffer writes incoming data carriers out of order.

5. The system of claim 1, wherein said RAM buffer is read in order.

6. The system of claim 1, wherein said buffer address calculation module comprises a controller.

7. The system of claim 1, wherein said system reduces a memory built-in self test (BIST) area in said receiver.

8. A method of performing time and frequency de-interleaving of interleaved data in an Integrated Services Digital Broadcasting Terrestrial (ISDB-T) receiver, said method comprising:
    de-interleaving said interleaved data in both a time and frequency domain using exactly one random access memory (RAM) buffer; and
    generating a buffer address in said RAM buffer using a buffer address calculation module, wherein said buffer address calculation module increases a size of a time de-interleaver buffer by two locations.

9. The method of claim 8, wherein said RAM buffer comprises a dynamic random access memory (DRAM).

10. The method of claim 8, wherein said RAM buffer comprises a static random access memory (SRAM).

11. The method of claim 8, further comprising writing incoming data carriers to said RAM buffer out of order.

12. The method of claim 8, further comprising reading data carriers from said RAM buffer in order.

13. The method of claim 8, wherein said buffer address calculation module comprises a controller.

14. An Integrated Services Digital Broadcasting Terrestrial (ISDB-T) receiver comprising:
    exactly one random access memory (RAM) buffer that performs both time and frequency de-interleaving of said interleaved data; and
    a buffer address calculation module that generates a buffer address in said buffer and increases a size of a time de-interleaver buffer by two locations.

15. The receiver of claim 14, wherein said RAM buffer comprises a dynamic random access memory (DRAM).

16. The receiver of claim 14, wherein said RAM buffer comprises a static random access memory (SRAM).

17. The receiver of claim 14, wherein said RAM buffer writes incoming data carriers out of order.

18. The receiver of claim 14, wherein said RAM buffer is read in order.

19. The receiver of claim 14, wherein said buffer calculation module comprises a controller.

20. The receiver of claim 14, wherein a memory built-in self test (BIST) area in said receiver is reduced.

* * * * *